United States Patent
Maeda et al.

(10) Patent No.: US 7,559,864 B2
(45) Date of Patent: Jul. 14, 2009

(54) ENGINE STARTING DEVICE AND ENGINE STARTING METHOD FOR HYBRID MOTOR VEHICLE

(75) Inventors: Yasuhiro Maeda, Toyota (JP); Toshinari Suzuki, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 70 days.

(21) Appl. No.: 11/907,799

(22) Filed: Oct. 17, 2007

(65) Prior Publication Data

US 2008/0093137 A1    Apr. 24, 2008

(30) Foreign Application Priority Data

Oct. 23, 2006   (JP)   .............................. 2006-288125

(51) Int. Cl.
*F16H 3/72*     (2006.01)
*H02P 17/00*    (2006.01)

(52) U.S. Cl. ................ 475/5; 475/8; 475/906; 477/20; 903/913; 903/923; 180/65.2

(58) Field of Classification Search ............ 475/2, 475/5, 8, 906; 477/15, 20; 903/913, 923, 903/945; 180/65.2, 65.6, 65.7
See application file for complete search history.

(56) References Cited

U.S. PATENT DOCUMENTS

2006/0011395 A1*  1/2006  Sugiyama et al. .......... 180/65.4
2007/0138986 A1*  6/2007  Kutsuna et al. ............. 318/254
2007/0155583 A1*  7/2007  Tabata et al. ............... 477/37

FOREIGN PATENT DOCUMENTS

| JP | A-2003-127679 | 5/2003 |
| JP | A-2005-001563 | 1/2005 |
| JP | A-2005-008100 | 1/2005 |
| JP | A-2005-264762 | 9/2005 |
| JP | A 2005-299406 | 10/2005 |
| JP | A-2008-049825 | 3/2008 |
| WO | WO 2007/099879 A1 | 9/2007 |

\* cited by examiner

*Primary Examiner*—Tisha D Lewis
(74) *Attorney, Agent, or Firm*—Oliff & Berridge, PLC

(57) ABSTRACT

A hybrid motor vehicle includes a differential having a differential mechanism equipped with a first rotating element that is connected to an engine, a second rotating element that is connected to a first electric motor and a third rotating element connected to both a second electric motor and a transfer member; and a transmission provided in a power transmission path, extending from the transfer member to driven wheels, that establishes a plurality of transmission ranges by selectively operating a plurality of coupling devices. An irreversible rotation member connected to a non-rotation member against reverse rotation through a one-way clutch is provided in the transmission. When the second electric motor is malfunctioning, an engine start control unit starts the engine by driving the first electric motor while selectively engaging the coupling devices to connect the transfer member to the irreversible rotation member.

4 Claims, 9 Drawing Sheets

FIG. 2

|  | C1 | C2 | C3 | B1 | B2 | F |
|---|---|---|---|---|---|---|
| 1st | O |  |  |  | ◎ | O |
| 2nd | O |  |  | O |  |  |
| 3rd | O | O |  |  |  |  |
| 4th |  | O |  | O |  |  |
| Rev |  |  | O |  | O |  |
| N |  |  |  |  |  |  |

ENGINE STARTING DEVICE AND ENGINE STARTING METHOD FOR HYBRID MOTOR VEHICLE

INCORPORATION BY REFERENCE

The disclosure of Japanese Patent Application No. 2006-288125 filed on Oct. 23, 2006 including the specification, drawings and abstract is incorporated herein by reference in its entirety.

BACKGROUND OF THE INVENTION

1. Field of Invention

The present invention relates to an engine starting device and an engine starting method for a hybrid motor vehicle that include an electric differential, which includes a differential mechanism and an electric motor. The engine starting device and the engine starting method also include a transmission provided in a power transmission path that extends from the differential to the driven wheels; and more particularly, to an engine starting device that operates when an electric motor is malfunctioning.

2. Description of the Related Art

A powertrain for a hybrid motor vehicle includes a differential that includes a differential mechanism including a first rotating element connected to an engine, a second rotating element connected to a first electric motor and a third rotating element connected to both a second electric motor and a transfer member, the differential distributes the output power of the engine to the first electric motor and the transfer member, and a transmission is provided in a power transmission path that extends from the transfer member to the driven wheels. In this powertrain, there is known a control device that increases the rotational speed of engine to an engine starting speed (ignitable speed) or more when starting the engine by using the first or second electric motor.

For example, Japanese Patent Application Publication No. JP-2005-264762 describes a control device for a motor vehicle drive unit. The control device is used in a transmission mechanism that includes a differential whose differential mechanism includes of planetary gear sets, and a transmission that consists of a stepped automatic transmission in which a power transmission path is selectively converted between a power transfer state and a power interrupting state by engagement operations of hydraulically-operated frictional coupling devices. When starting an engine with the transmission is in "P (Parking)" or neutral "N (Neutral)", which keeps the power transmission path in the power interrupting state, the control device increases the respective rotational speeds of a second rotating element and a third rotating element by using the first and second electric motors, thereby ensuring that the rotational speed of the first rotating element, i.e., the rotational speed of the engine connected to the first rotating element, is rapidly increased to at least an engine starting speed in accordance with the relationship of the relative rotational speeds between the first, second and third rotating elements.

If the second electric motor malfunctions or fails in the motor vehicle drive unit described in Japanese Patent Application Publication No. JP-2005-264762, however, no reaction force is generated by the second electric motor connected to the third rotating element. Even if the first electric motor is driven in this situation, the third rotating element, which is connected to the second electric motor, is rotated in a reverse direction. For instance, while a motor vehicle waits for a stoplight to change, i.e., when the vehicle speed is zero while a shift lever is in a "D (Drive)" position, the engine is typically stopped to reduce fuel consumption. If the second electric motor malfunctions or fails when the engine is started again, there is a need to adopt a reaction force generating method that does not resort to the second electric motor. It would be conceivable, as an alternative reaction force generating method, to generate a reaction force by bringing the power transmission path extending from a power transfer member to driven wheels into a power transferable state and connecting the third rotating element to the driven wheels through the transmission. However, this may reverse the rotation of the third rotating element when the shift lever is in the "D" position. The reason is that, when the shift lever is in the "D" position, there no lock mechanism is provided, unlike the lock that serves to mechanically lock the output shaft when the shift lever position is in "P" position. Accordingly, if the second electric motor malfunctions or fails when the shift lever is not in "P" position, it may be impossible to start the engine.

SUMMARY OF THE INVENTION

The present invention provides an engine starting device and an engine starting method for a hybrid motor vehicle that safely start the engine even when an electric motor that generates a reaction force when starting the engine of the hybrid motor vehicle malfunctions.

In accordance a first aspect of the present invention, an engine starting device for a hybrid motor vehicle is provided that includes: a differential equipped with a differential mechanism that includes a first rotating element connected to an engine, a second rotating element connected to a first electric motor and a third rotating element that is connected to both a second electric motor and a transfer member, the differential mechanism distributes the output power of the engine to the first electric motor and the transfer member; a transmission, provided in a power transmission path that extends from the transfer member to driven wheels, that establishes a plurality of transmission ranges by selectively operating a plurality of coupling devices, wherein an irreversible rotation member connected to a non-rotation member against reverse rotation through a one-way clutch is provided in the transmission; and an engine start control unit that starts the engine by driving the first electric motor while selectively engaging the coupling devices to connect the transfer member to the irreversible rotation member when the second electric motor malfunctions.

In accordance with the first aspect of the present invention, even if the second electric motor, which generates a reaction force when driving the first electric motor to start the engine, fails, it is possible to hold the third rotating element against movement, i.e., to generate a reaction force, by suitably engaging the engagement devices and directly or indirectly connecting the third rotating element to the rotation member which cannot rotate in opposite direction. This makes it possible to start the engine with no risk of reverse movement of the motor vehicle even when a shift position is in a "D" range.

The engine start control may directly connect the transfer member to the irreversible rotation member by selectively engaging the coupling devices when the second electric motor malfunctions.

Further, in accordance with this aspect, it is possible to generate a reaction force in the third rotating element and to start the engine without having to restrict rotation of other rotating elements, by engaging the coupling devices and directly connecting the transfer member to the rotation member, which cannot rotate in opposite direction.

The coupling devices may comprise a brake that holds a specified rotation member against rotation and the engine start control may connect the transfer member to another rotation member that becomes unable to rotate in the reverse direction when the brake is engaged.

Furthermore, in accordance with this aspect, it is possible to generate a reaction force in the third rotating element and to start the engine by providing the additional rotation member that cannot rotate in opposite direction when the brake is engaged and the transfer member is connected to the additional rotation member.

In addition, the engine start control unit may engage the coupling devices to drive the first electric motor, when it is determined that the second electric motor is malfunctioning, the vehicle speed is equal to or smaller than a predetermined value, an engine start is requested, and a shift lever is in a driving range.

Moreover, in accordance with this aspect, it is possible to safely start the engine when the second electric motor fails, because of the fact that the engine start control means is adapted to engage the coupling devices and drive the first electric motor, based on a determination that the second electric motor is malfunctioning, the vehicle speed is equal to or smaller than a predetermined value, engine start is requested, and a shift lever is in a driving range.

In accordance with a second aspect of the present invention, an engine starting method for a hybrid motor vehicle that includes a differential equipped with a differential mechanism having a first rotating element connected to an engine, a second rotating element connected to a first electric motor and a third rotating element connected to both a second electric motor and a transfer member, the differential mechanism adapted to distribute an output power of the engine to the first electric motor and the transfer member; and a transmission provided in a power transmission path that extends from the transfer member to driven wheels, the transmission adapted to establish a plurality of transmission ranges by selectively operating a plurality of coupling devices, wherein an irreversible rotation member connected to a non-rotation member against reverse rotation through a one-way clutch is provided in the transmission, the method comprising: starting the engine by driving the first electric motor while selectively engaging the coupling devices to connect the transfer member to the irreversible rotation member when the second electric motor malfunctions.

In accordance with a third aspect of the present invention, an engine starting method for a hybrid motor vehicle that includes a differential equipped with a differential mechanism having a first rotating element connected to an engine, a second rotating element connected to a first electric motor and a third rotating element connected to both a second electric motor and a transfer member, the differential mechanism adapted to distribute an output power of the engine to the first electric motor and the transfer member; and a transmission provided in a power transmission path that extends from the transfer member to driven wheels, the transmission adapted to establish a plurality of transmission ranges by selectively operating a plurality of coupling devices, wherein an irreversible rotation member connected to a non-rotation member against reverse rotation through a one-way clutch is provided in the transmission, the method comprising: determining whether the second electric motor is malfunctioning, whether the vehicle speed is equal to or smaller than a predetermined value, whether there is a request to start the engine, and whether a shift lever is placed in a driving position; selectively engaging the coupling devices to connect the transfer member to the irreversible rotation member rotating element; and starting the engine by driving the first electric motor.

BRIEF DESCRIPTION OF THE DRAWINGS

The above and other features of the present invention will become apparent from the following description of embodiments given in conjunction with the accompanying drawings, in which:

FIG. 2 shows an operation table for explaining operation combinations of hydraulically-operated frictional coupling devices used in shift operations of the drive unit shown in FIG. 1;

DETAILED DESCRIPTION OF EMBODIMENTS

Hereinafter, an embodiment of the present invention will be described in detail with reference to the accompanying drawings.

Figure 1:
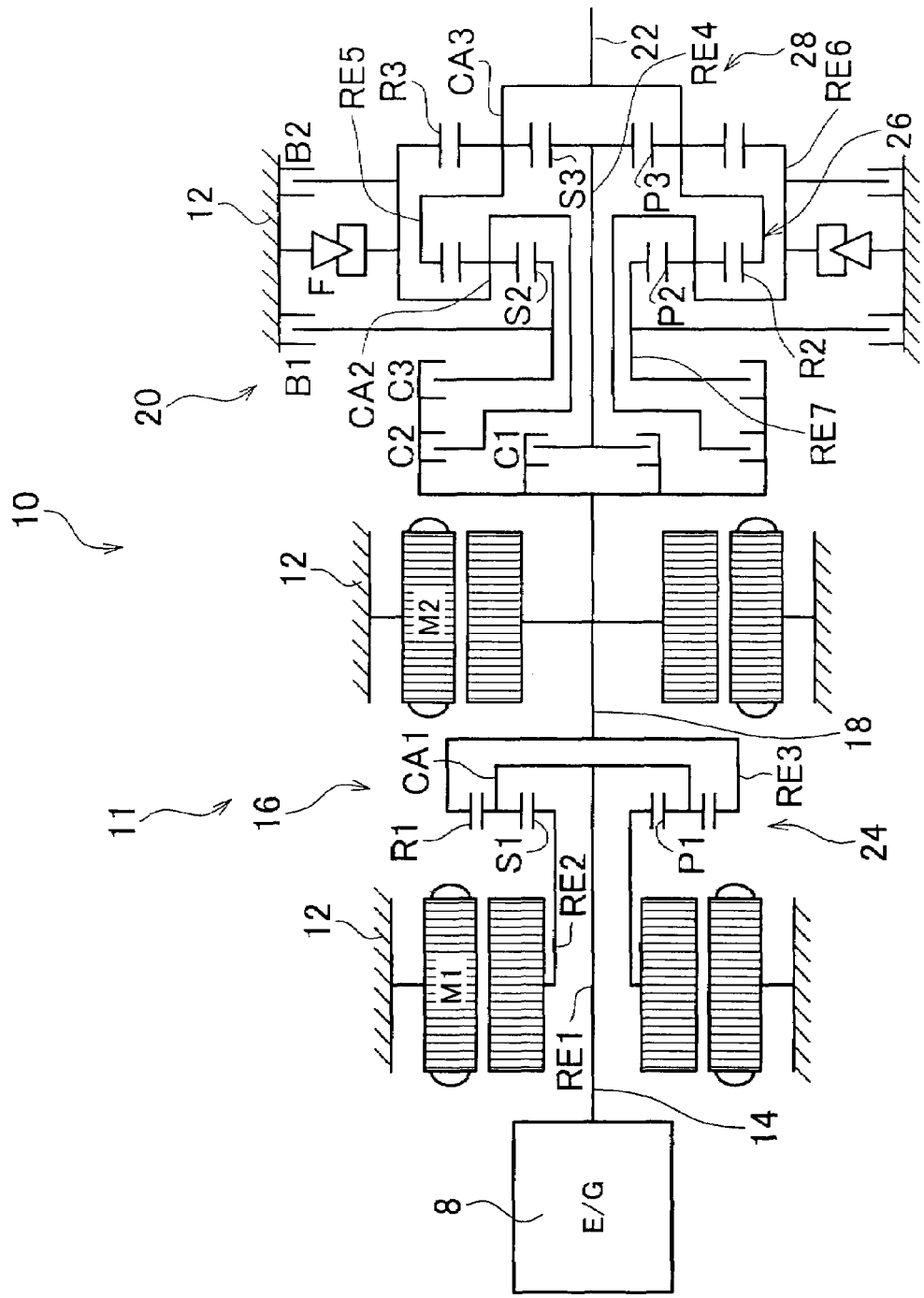
FIG. 1 is a schematic diagram for explaining a transmission mechanism as a part of a drive unit for hybrid motor vehicles in accordance with one embodiment of the present invention.

FIG. 1 is a schematic diagram for explaining a transmission mechanism 10 that included in a part of a drive unit for a hybrid motor vehicle to which the present invention is applied. Referring to FIG. 1, the transmission mechanism 10 serially includes an input shaft 14 as an input rotation member arranged on a common axis within a transmission case 12 (hereinbelow simply referred to as "case 12") as a non-rotation member attached to a vehicle body, a differential 11 as a continuously variable transmission directly connected to the input shaft 14 or indirectly connected thereto via a pulsation absorbing damper (vibration damping device) not shown in the drawings, an automatic transmission 20 as a power transfer part serially connected to the differential 11 through a transfer member 18 in a power transmission path extending from the differential 11 to driven wheels 34 (see FIG. 6), and an output shaft 22 as an output rotation member connected to the automatic transmission 20. The transmission mechanism 10 is adapted to be used in, e.g., a front-engine and rear-drive (FR) type motor vehicle, and is provided between an internal combustion engine 8, such as a gasoline engine or a diesel engine, and a pair of driven wheels 34 (see FIG. 6), wherein the engine 8 serves as a driving power source directly connected to the input shaft 14 or directly connected thereto via a pulsation absorbing damper (not shown). The transmission mechanism 10 delivers power from the engine 8 to the pair of driven wheels 34 sequentially via a differential gear unit (a final reduction gear) 32 (see FIG. 6), a pair of axles and so forth, which form a part of the power transmission path. In this embodiment, the transmission case 12 corresponds to the non-rotation member of the present invention, while the automatic transmission 20 corresponds to the transmission of the present invention.

As noted above, in the transmission mechanism 10 of the present embodiment, the engine 8 and the differential 11 are directly connected to each other. The term "direct connection" used herein means that coupling is made with no intervention of a hydraulic power transmission device such as a torque converter or a fluid coupling. Coupling made by way of, e.g., the pulsation absorbing damper set forth above, is included in the notion of the "direct connection".

The differential 11 includes a first electric motor M1; a power distribution mechanism 16 which mechanically distributes output power of the engine 8 connected to the input shaft 14 as a differential mechanism for distributing the output power of the engine 8 to the first electric motor M1 and the transfer member 18; and a second electric motor M2 operatively connected to the transfer member 18 for unitary rotation therewith. In the present embodiment, the first electric motor M1 and the second electric motor M2 are so-called motor-generators having also a function of electric power generation. The first electric motor M1 has at least a function of a generator (electric power generation) for producing a reaction force and the second electric motor M2 has at least a function of a motor (electric motor) for outputting drive power as a driving power source. The power distribution mechanism 16 in this embodiment corresponds to the differential of the present invention.

The power distribution mechanism 16 mainly includes a single pinion type first planetary gear set 24 having a specified gear ratio ρ1. The first planetary gear set 24 includes, as its rotating elements, a first sun gear S1, first planet gears P1, a first carrier CA1 for supporting the first planet gears P1 so that they can both rotate and revolve, and a first ring gear R1, engaged with the first sun gear S1 through the first planet gears P1. Assuming that the first sun gear S1 has a teeth number of ZS1 and the first ring gear R1 has a teeth number of ZR1, the gear ratio ρ1 is ZS1/ZR1.

In the power distribution mechanism 16, the first carrier CA1 is connected to the input shaft 14, i.e., the engine 8, and is included in a first rotating element RE1. The first sun gear S1 is connected to the first electric motor M1 and is included in a second rotating element RE2. The first ring gear R1 is connected to the transfer member 18 and constitutes a third rotating element RE3. Because the three components of the first planetary gear set 24, i.e., the first sun gear S1, the first carrier CA1 and the first ring gear R1, are rotatable relative to one another, the power distribution mechanism 16 configured as described above comes into a differential state in which a differential action works. Thus, the output power of the engine 8 is distributed to the first electric motor M1 and the transfer member 18. By a part of the output power of the engine 8 thus distributed, the first electric motor M1 generates an electric energy to be charged or the second electric motor M2 is rotated by the electric energy. For this reason, the differential 11 (power distribution mechanism 16) functions as an electric differential gear and comes into a so-called continuously variable shifting state, thereby ensuring that the rotational speed of the transfer member 18 is continuously varied irrespective of the rotational speed of the engine 8. In other words, the differential 11 serves as an electric continuously variable transmission whose transmission ratio γ0 (a rotational speed $N_{IN}$ of the input shaft 14)/(a rotational speed $N_{18}$ of the transfer member 18), is continuously variable from a minimum value γ0min to a maximum value γ0max.

The automatic transmission 20 is provided in the power transmission path extending from the transfer member 18 to the driven wheels 34 and is a planetary gear type multi-stage transmission that serves as a stepped automatic transmission and includes a single pinion type second planetary gear set 26 and a single pinion type third planetary gear set 28. The second planetary gear set 26 includes a second sun gear S2, second planet gears P2, a second carrier CA2 for supporting the second planet gears P2 to allow them to be rotatable on their own axis and revolvable around the second sun gear S2, and a second ring gear R2 engaged with the second sun gear S2 through the second planet gears P2. The second planetary gear set 26 has a predetermined gear ratio p2. The third planetary gear set 28 includes a third sun gear S3, third planet gears P3, a third carrier CA3 for supporting the third planet gears P3 to allow them to be rotatable on their own axis and revolvable around the axis of the third sun gear S3, and a third ring gear R3 engaged with the third sun gear S3 through the third planet gears P3. The third planetary gear set 28 has a predetermined gear ratio p3. Where the numbers of teeth of the second sun gear S2, second ring gear R2, third sun gear S3, and third ring gear R3 are represented by ZS2, ZR2, ZS3, and ZR3, respectively, the above gear ratio p2 is represented by ZS2/ZR2 and the gear ratio p3 is represented by ZS3/ZR3.

In the automatic transmission 20, the second sun gear S2 is selectively connected to the transfer member 18 through a third clutch C3 and selectively connected to the case 12 through a first brake B1. The second carrier CA2 and the third ring gear R3 are integrally connected to each other, and are selectively connected to the transfer member 18 through a second clutch C2 and selectively connected to the case 12 through a second brake B2. The second ring gear R2 and the third carrier CA3 are integrally connected to each other, and connected to the output shaft 22. The third sun gear S3 is selectively connected to the transfer member 18 through a first clutch C1. Furthermore, the second carrier CA2 and the third ring gear R3 are connected to the case 12 of the non-rotation member through a one-way clutch F so that the second carrier CA2 and the third ring gear R3 rotate in the same direction as the engine 8, but are prohibited from rotating in the opposite direction. This ensures that the second carrier CA2 and the third ring gear R3 rotate in only one direction.

In the automatic transmission 20, a plurality of gear ranges (transmission ranges) are selectively established by appropriately engaging and releasing the clutches and the brakes. The gear ranges have respective substantially geometrically changing transmission ratios γ, (rotational speed $N_{18}$ of the transfer member 18)/(rotational speed $N_{OUT}$ of the output shaft 22). For example, as indicated in an engagement operation table of FIG. 2, a first gear range is established by engaging the first clutch C1 and action of the one-way clutch F. A second gear range is established by engaging the first clutch C1 with the first brake B1. A third gear range is established by engaging the first clutch C1 with the second clutch C2. A fourth gear range is established by engaging the second clutch C2 with the first brake B1. A reverse gear range is established by engaging the third clutch C3 and the second brake B2. Furthermore, neutral "N" is attained by releasing the first clutch C1, the second clutch C2, the third clutch C3, the first brake B1 and the second brake B2. Moreover, the second brake B2 is engaged to ensure that engine brake works upon the first gear range.

As set forth above, depending on the combinations of engaging and releasing actions of the first clutch C1, the second clutch C2, the third clutch C3, the first brake B1 and the second brake B2, the power transmission path within the automatic transmission 20 is converted between a power transfer state and a power interrupt state. In other words, establishing of one of the first to fourth gear ranges and the reverse gear range brings the power transmission path into the power transfer state, while non-establishment of all the gear ranges, i.e., establishing neutral "N" brings the power transmission path into the power interrupt state.

The first clutch C1, the second clutch C2, the third clutch C3, the first brake B1 and the second brake B2 (hereinafter "clutches C" and "brakes B" unless specifically distinguished) are hydraulically operated frictional coupling devices as coupling elements in a conventional vehicular automatic transmission. Each clutch C and brake B includes wet-type multi-discs in which a plurality of overlapped friction discs are forced against each other by a hydraulic actuator, a band brake that includes a rotating drum and one or two bands wound on the outer circumferential surface of the rotating drum and tightened at one end by means of a hydraulic actuator, or the like. Each clutch C and brake B is used in selectively connecting two opposite members between which it is interposed. Moreover, the clutches C and the brakes B in this embodiment function as the coupling devices of the present invention.

In the transmission mechanism 10 configured as described above, the differential 11 functions as a stepless transmission and the automatic transmission 20 are included in a continuously variable transmission. Furthermore, by controlling the transmission ratio of the differential 11 to become constant, it is possible to make the differential 11 and the automatic transmission 20 function as a stepped variable transmission.

More specifically, because of the fact that the differential 11 serves as a continuously variable transmission and the automatic transmission 20 serially connected to the differential 11 serves as a stepped transmission, the rotational speed transmitted to the automatic transmission 20 (hereinafter "input rotational speed of the automatic transmission 20"), i.e., the rotational speed of the transfer member 18 (hereinafter "transfer member rotational speed $N_{18}$"), varies continuously in at least one transmission range M. This makes it possible to obtain a predetermined range of continuously variable transmission ratio in the transmission range M. Accordingly, it is possible to obtain a general transmission ratio γT of the transmission mechanism 10, (rotational speed $N_{IN}$ of the input shaft 14)/((rotational speed $N_{OUT}$ of the output shaft 22), in a stepless manner, thus providing a continuously variable transmission in the transmission mechanism 10. The general transmission ratio γT of the transmission mechanism 10 refers to a total transmission ratio γT for the entirety of the transmission mechanism 10, which is determined by the transmission ratio γ0 of the differential 11 and the transmission ratio γ of the automatic transmission 20.

For example, the transfer member rotational speed $N_{18}$ varies continuously in the respective gear ranges including the first to fourth gear ranges and the reverse gear range of the automatic transmission 20 indicated in the engagement operation table of FIG. 2. This allows each of the respective gear ranges to have a breadth of continuously variable transmission ratio. As a result, a continuously variable transmission ratio becomes available between the gear ranges, thereby making it possible to obtain a total transmission ratio γT for the entirety of the transmission mechanism 10 in a stepless manner.

Furthermore, if the transmission ratio of the differential 11 is controlled to be constant and if the clutches C and the brakes B are selectively engaged to establish one of the first to fourth gear ranges or the reverse gear range (reverse transmission range), a total transmission ratio γT of the transmission mechanism 10 that changes substantially geometrically can be obtained in the respective gear ranges. This provides an equivalent of a stepped transmission in the transmission mechanism 10.

Figure 3:
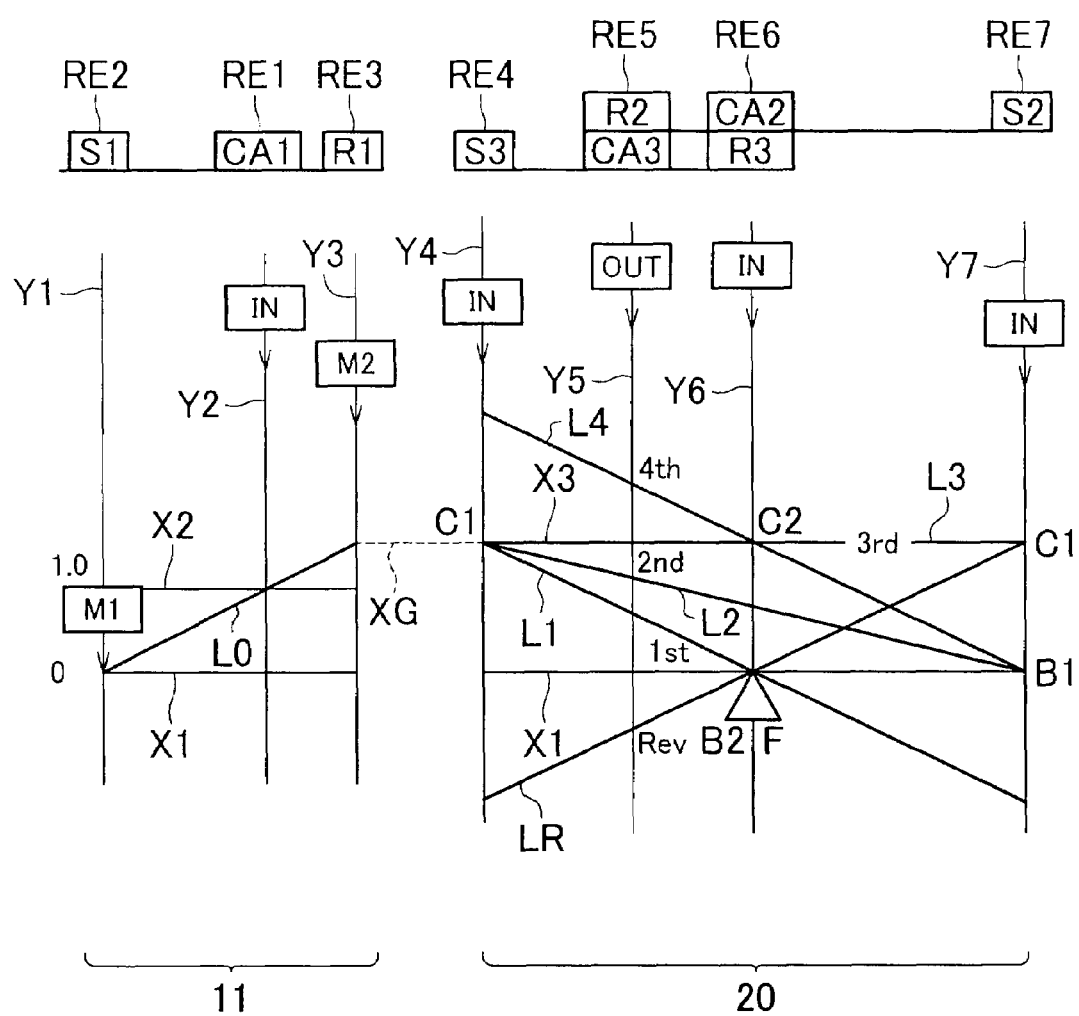
FIG. 3 is a collinear diagram for explaining relative rotational speeds in individual gear ranges of the drive unit shown in FIG. 1.

FIG. 3 is a collinear diagram indicating, by straight lines, a correlation of rotational speeds of the individual rotating elements differently connected in each of the gear ranges in the transmission mechanism 10 including the differential 11 and the automatic transmission 20. The collinear diagram is two-dimensional coordinates having a horizontal axis that represents the correlation of gear ratios ρ of the respective planetary gear sets 24, 26 and 28 and a vertical axis that represents the relative rotational speeds. Among three horizontal lines, the lower horizontal line X1 denotes a zero rotational speed, the upper horizontal line X2 denotes a rotational speed of 1.0, i.e., a rotational speed $N_E$ of the engine 8 connected to the input shaft 14, and the horizontal line X3 denotes a rotational speed of the third rotating element RE3, which will be described later, input from the differential 11 to the automatic transmission 20.

Three vertical lines Y1, Y2 and Y3, corresponding to the three elements of the power distribution mechanism 16 included in the differential 11 respectively, represent, sequentially from the left, relative rotational speeds of the first sun gear S1, which is an embodiment of the second rotating element RE2, the first carrier CA1, which is an embodiment of the first rotating element RE1, and the first ring gear R1, which is an embodiment of the third rotating element RE3. Intervals between these vertical lines are determined by the gear ratio ρ1 of the first planetary gear set 24. Furthermore, four vertical lines Y4, Y5, Y6 and Y7 for the automatic transmission 20 respectively represent, sequentially from the left, relative rotational speeds of the third sun gear S3, which is an embodiment of a fourth rotating element RE4, the interconnected combination of the second ring gear R2 and the third carrier CA3, which is an embodiment of a fifth rotating element RE5, the interconnected combination of the second carrier CA2 and the third ring gear R3, which is an embodiment of a sixth rotating element RE6, and the second sun gear S2, which is an embodiment of a seventh rotating element RE7. Intervals between these vertical lines are determined by the gear ratios ρ2 and ρ3 of the second and third planetary gear sets 26 and 28. In the relationship between the vertical lines of the collinear diagram, if the interval between the sun gear line and the carrier line becomes an interval corresponding to "1", the interval between the carrier line and the ring gear line becomes an interval corresponding to the gear ratio ρ of the planetary gear set. That is to say, in the differential 11, an interval corresponding to "1" is set between the vertical lines Y1 and Y2 and an interval corresponding to the gear ratio ρ1 is set between the vertical lines Y2 and Y3. Moreover, in the automatic transmission 20, for each of the second and third planetary gear sets 26 and 28, an interval corresponding to "1" is set between the sun gear and the carrier and an interval corresponding to the gear ratio ρ is set between the carrier and the ring gear.

Referring to the collinear diagram illustrated in FIG. 3, the transmission mechanism 10 of the present embodiment is configured in such a way that, in the power distribution mechanism 16 (differential 11), the first rotating element RE1 (first carrier CA1) of the first planetary gear set 24 is connected to the input shaft 14, i.e., the engine 8, the second rotating element RE2 is connected to the first electric motor M1, and the third rotating element RE3 (first ring gear R1) is connected to the transfer member 18 and the second electric motor M2, thereby transferring (inputting) rotation of the input shaft 14 to the automatic transmission 20 through the transfer member 18. In this regard, the relationship between the rotational speed of the first sun gear S1 and the rotational speed of the first ring gear R1 is represented by an inclined straight line L0 that passes through a point of intersection between the line Y2 and the line X2.

As an example, in the differential 11, if the first to third rotating elements RE1, RE2 and RE3 are in a differential state in which they rotate elative to one another and if the rotational speed of the first ring gear R1, represented by a point of intersection between the straight line L0 and the vertical line Y3, becomes substantially constant by the restriction on a vehicle speed V, the rotational speed of the first carrier CA1, i.e., the engine rotational speed $N_E$, represented by a point of intersection between the straight line L0 and the vertical line Y2, increases or decreases as the rotational speed of the first sun gear S1, indicated by a point of intersection between the straight line L0 and the vertical line Y1, is increased or decreased by controlling the rotational speed of the first electric motor M1.

Furthermore, if the rotational speed of the first sun gear S1 is made equal to the engine rotational speed $N_E$ by controlling the rotational speed of the first electric motor M1 to maintain the transmission ratio γ0 of the differential 11 at "1", the straight line L0 coincides with the horizontal line X2, as a result of which the first ring gear R1, i.e., the transfer member 18, rotates at the same speed as the engine rotational speed $N_E$. If the rotational speed of the first sun gear S1 is made to be zero by controlling the rotational speed of the first electric motor M1 to keep the transmission ratio γ0 of the differential 11 at a value smaller than "1", e.g., 0.7, the straight line L0 is brought into the state shown in FIG. 3, as a result of which the transfer member 18 rotates at a speed higher than the engine rotational speed $N_E$.

In the automatic transmission 20, the fourth rotating element RE4 is selectively connected to the transfer member 18 through the first clutch C1, the fifth rotating element RE5 is connected to the output shaft 22, the sixth rotating element RE6 is selectively connected to the transfer member 18 through the second clutch C2 and also selectively connected to the case 12 through the second brake B2, and the seventh rotating element RE7 is selectively connected to the transfer member 18 through the third clutch C3 and also selectively connected to the case 12 through the first brake B1.

In the automatic transmission 20, if the rotational speed of the first sun gear S1 is made to be about zero by, e.g., controlling the rotational speed of the first electric motor M1 of the differential 11, the straight line L0 is brought into the state shown in FIG. 3, as a result of which the third rotating element RE3 rotates at a speed higher than the engine rotational speed $N_E$. Referring to FIG. 3, when the first clutch C1 and the second brake B2 are engaged, the rotational speed of the output shaft 22 in the first gear range is represented by a point of intersection between an inclined straight line L1 and the vertical line Y5, which indicates the rotational speed of the fifth rotating element RE5 connected to the output shaft 22, wherein the inclined straight line L1 passes through a point of intersection between the horizontal line X3 and the vertical line Y4, which indicates the rotational speed of the fourth rotating element RE4, and a point of intersection between the horizontal line X1 and the vertical line Y6, which indicates the rotational speed of the sixth rotating element RE6. Similarly, the rotational speed of the output shaft 22 in the second gear range is represented by a point of intersection between an inclined straight line L2, determined by engagement of the first clutch C1 and the first brake B1, and the vertical line Y5, which indicates the rotational speed of the fifth rotating element RE5 connected to the output shaft 22. The rotational speed of the output shaft 22 in the third gear range is represented by a point of intersection between a horizontal straight line L3, determined by engagement of the first clutch C1 and the second clutch C2, and the vertical line Y5, which indicates the rotational speed of the fifth rotating element RE5 connected to the output shaft 22. The rotational speed of the output shaft 22 in fourth transmission range is represented by a point of intersection between an inclined straight line L4, determined by engagement of the second clutch C2 and the first brake B1, and the vertical line Y5, which indicates the rotational speed of the fifth rotating element RE5 that is connected to the output shaft 22.

Figure 4:
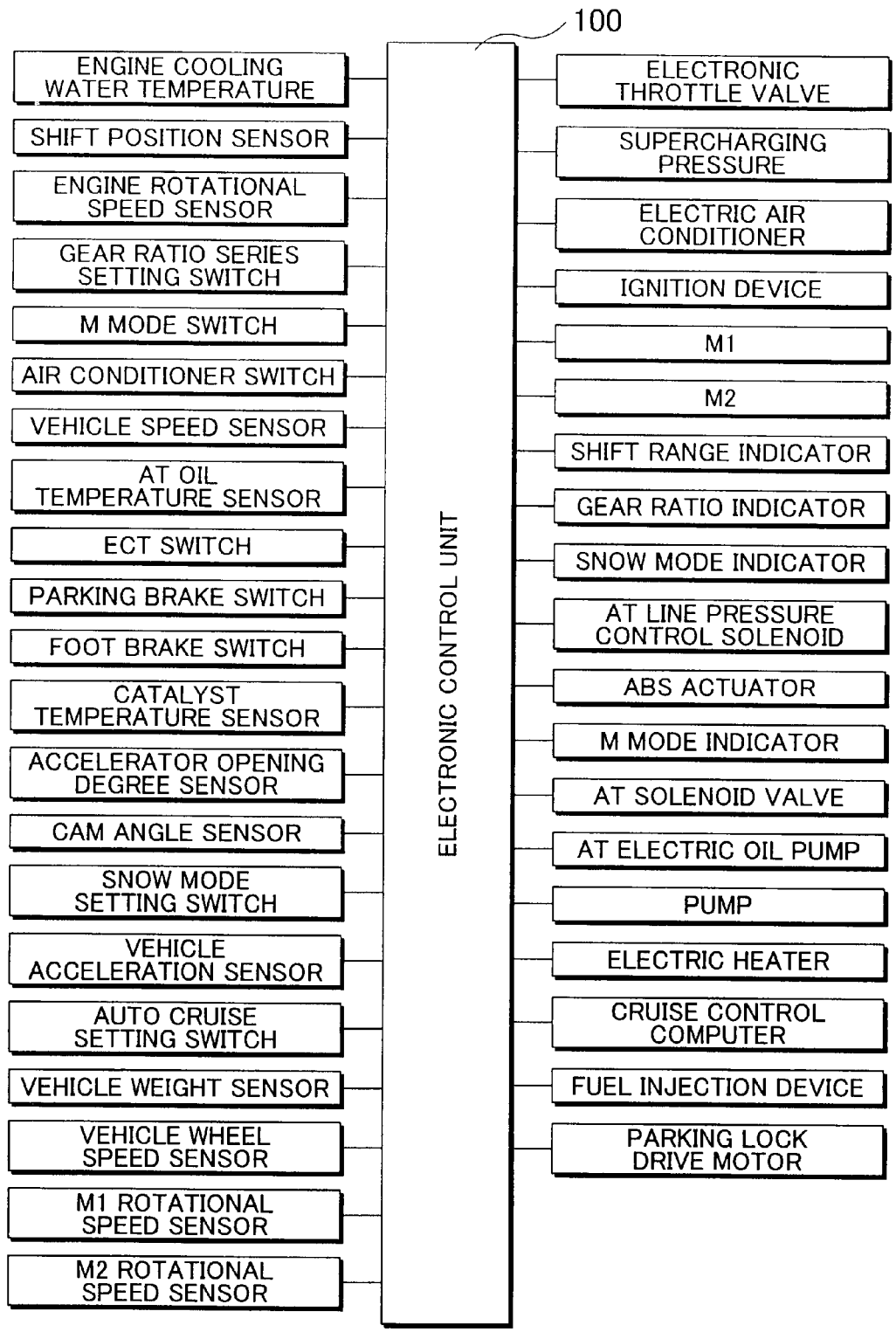
FIG. 4 is a view for explaining input and output signals of an electronic control unit provided in the drive unit shown in FIG. 1.

FIG. 4 illustrates signals input to and output from an electronic control unit 100 that controls the transmission mechanism 10 of the present embodiment. The electronic control unit 100 includes a so-called microcomputer including a CPU, a ROM, a RAM, an input/output interface and the like. By processing signals in accordance with a program prestored in the ROM while using a temporary storage function of the RAM, the electronic control unit 100 performs drive control, including hybrid drive control for the engine 8 and the first and second electric motors M1 and M2 and shift control for the automatic transmission 20.

Individual sensors and switches, as shown in FIG. 4, supply the electronic control unit 100 with signals that indicate the engine coolant temperature $TEMP_W$, the number of operations of a shift lever 52 (see FIG. 5) in a shift position $P_{SH}$ and an "M" position, the engine rotational speed $N_E$, the preset value of gear ratio series, an M mode (manual shift driving mode), the operating status of an air conditioner A/C, the vehicle speed V corresponding to the rotational speed of the output shaft 22 (hereinafter "output shaft rotational speed" $N_{OUT}$), the working oil temperature TOIL of the automatic transmission 20, a parking brake operation, a foot brake operation, the catalyst temperature, the accelerator operating amount Acc, the cam angle, the selection of a snow mode, the forward or reverse acceleration G of a motor vehicle, automatic cruise driving, the weight of a motor vehicle (a vehicle weight), the rotational speeds of individual vehicle wheels, the rotational speed $N_{M1}$ of the first electric motor M1 (hereinafter "first electric motor rotational speed $N_{M1}$"), the rotational speed $N_{M2}$ of the second electric motor M2 (hereinafter "second electric motor rotational speed $N_{M2}$"), the state of charge SOC of a charging device 56 (see FIG. 6), and so forth.

Among signals output from the electronic control unit 100 are control signals to an engine output power control unit 58 (see FIG. 6), e.g., a drive signal to a throttle actuator 64 for adjusting an opening degree $\theta_{TH}$ of a throttle valve 62 provided in an intake manifold 60 of the engine 8, a fuel supply quantity signal for controlling a quantity of fuel supplied by a fuel injection device 66 into the intake manifold 60 or cylinders of the engine 8 and an ignition signal commanding timing of ignition of the engine 8 by an ignition device 68, a supercharging pressure adjustment signal for adjusting a supercharging pressure, an electric air conditioner drive signal for operating an electric air conditioner, a command signal for commanding operations of the first and second electric motors M1 and M2, a shift position (operation position) indicating signal for activating a shift indicator, a gear ratio indicating signal for indicating a gear ratio, a snow mode indicating signal for indicating a snow mode, an ABS operation signal for operating an ABS actuator that prevents the vehicle wheels from slipping during braking, an M mode indicating signal for indicating selection of an M mode, a valve command signal for operating electromagnetic valves (linear solenoid valves) of a hydraulic control circuit 70 (see FIG. 6) to control hydraulic actuators of the hydraulically-operated frictional coupling devices in the differential 11 or the automatic transmission 20, a signal for allowing a regulator valve (pressure regulating valve) of the hydraulic control circuit 70 to regulate a line pressure $P_L$, a drive command signal for operating an electric fluid pump that generates an original fluid pressure which is used to regulate the line pressure $P_L$, a signal for operating an electric heater, a signal to be applied to a cruise control computer, a signal for driving a parking lock drive motor, and so forth.

Figure 5:
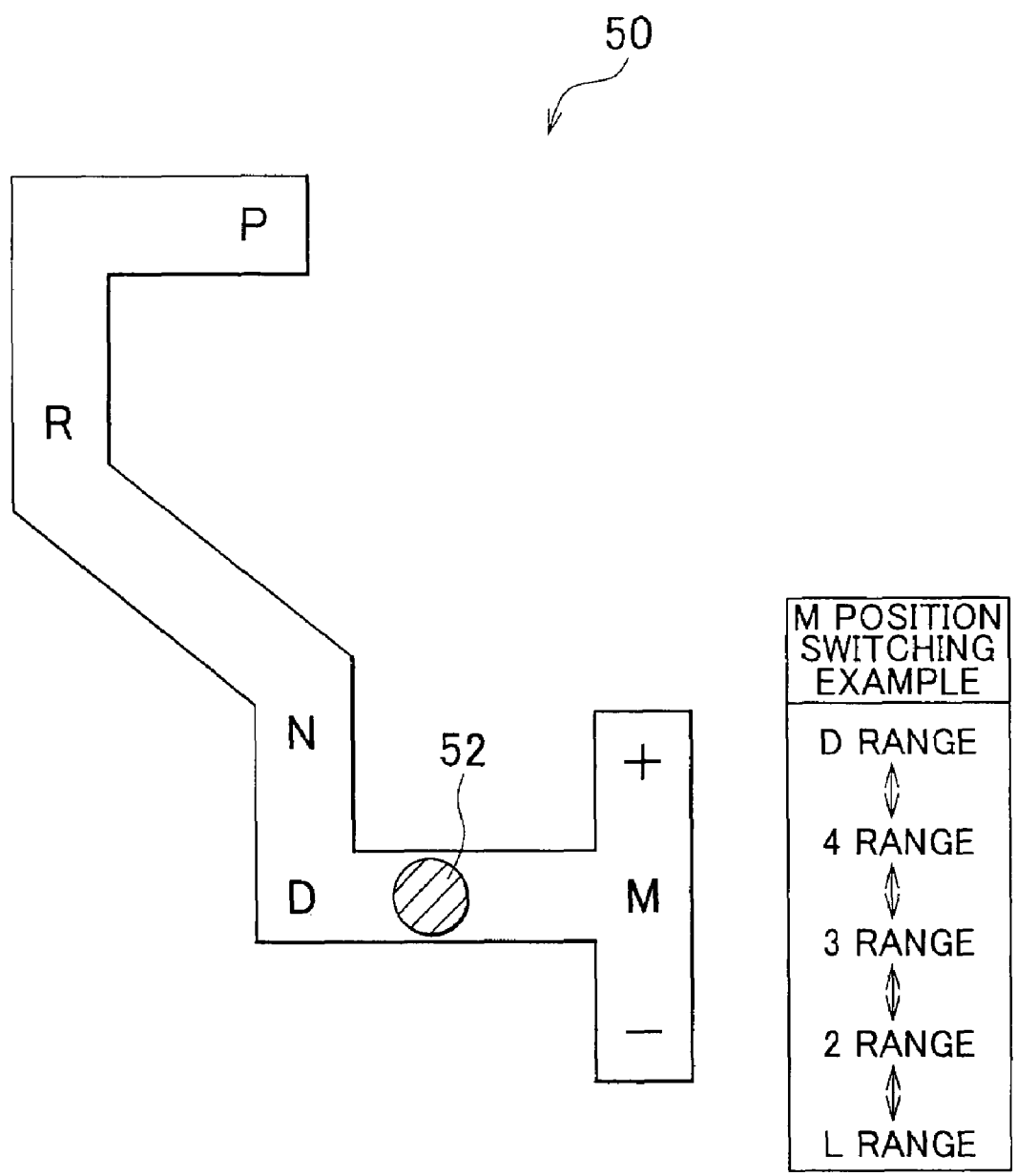
FIG. 5 shows one example of a shift operation device with a shift lever, which is operated to select one of different kinds of shift positions.

FIG. 5 is a view showing one example of a shift operation device 50 that converts different kinds of shift positions $P_{SH}$ by a manual operation. The shift operation device 50 is arranged in a position, e.g., next to a driver's seat, and includes a shift lever 52 operated to select one of the different kinds of shift positions $P_{SH}$.

The shift lever 52 is manually operated into a parking position "P (Parking)" for bringing the power transmission path in the transmission mechanism 10, namely in the automatic transmission 20, into an interrupting or neutral state and for holding (or locking) the output shaft 22 of the automatic transmission 20 against rotation, a reverse driving position "R (Reverse)" for allowing a motor vehicle to drive in a reverse direction, a neutral position "N (Neutral)" for bringing the power transmission path in the transmission mechanism 10 into an interrupting or neutral state, a forward automatic shift driving position "D (Drive)" for establishing an automatic shift mode and allowing automatic shift control to be performed within a variation extent of the total transmission ratio γT of the transmission mechanism 10 which is obtained by the respective gear ranges automatically shift-controlled within a breadth of continuously variable transmission ratio of the differential 11 and within a range of the first to fourth speed gear ranges of the automatic transmission 20, or a forward manual shift driving position "M (Manual)" for establishing a manual shift driving mode (manual mode) and setting a so-called shift range that restricts any up-shift to higher transmission ranges in the automatic transmission 20. In the "M" range, deceleration can be set by shifting the shift range, which means that the shift operation device 50 functions as a deceleration control device.

In order to ensure that the respective transmission ranges in the reverse gear range "R", the neutral gear range "N" and the forward gear range "D" shown in the engagement operation table of FIG. 2 can be established in response to the manual operation of the shift lever 52 into the shift positions $P_{SH}$, the hydraulic control circuit is electrically converted by, e.g., a so-called shift-by-wire system that converts the power transfer state of the transmission mechanism 10 by electric control.

Among the respective shift positions $P_{SH}$ indicated by the "P" through "M" ranges, the "P" and "N" ranges are non-driving positions selected when a motor vehicle is at rest and serve as out-of-drive positions where the power transmission path within the automatic transmission 20 is converted to a power interrupting state that makes it impossible to drive the motor vehicle. Furthermore, the "R", "D" and "M" ranges are driving positions selected when a motor vehicle is to be driven and serve as drive positions where the power transmission path within the automatic transmission 20 is converted to a power transferable state that makes it possible to drive the motor vehicle.

More specifically, as the shift lever 52 is manually operated into the "P" range, the clutches C and the brakes B are all released to thereby bring the power transmission path within the automatic transmission 20 into a power interrupting state and also to lock the output shaft 22 of the automatic transmission 20 against rotation. As the shift lever 52 is manually operated into the "N" range, the clutches C and the brakes B are all released to thereby bring the power transmission path within the automatic transmission 20 into the power interrupting state. As the shift lever 52 is manually operated into one of the "R", "D" and "M" ranges, one transmission range corresponding to each of the ranges is established to thereby bring the power transmission path within the automatic transmission 20 into a power transferable state.

Figure 6:
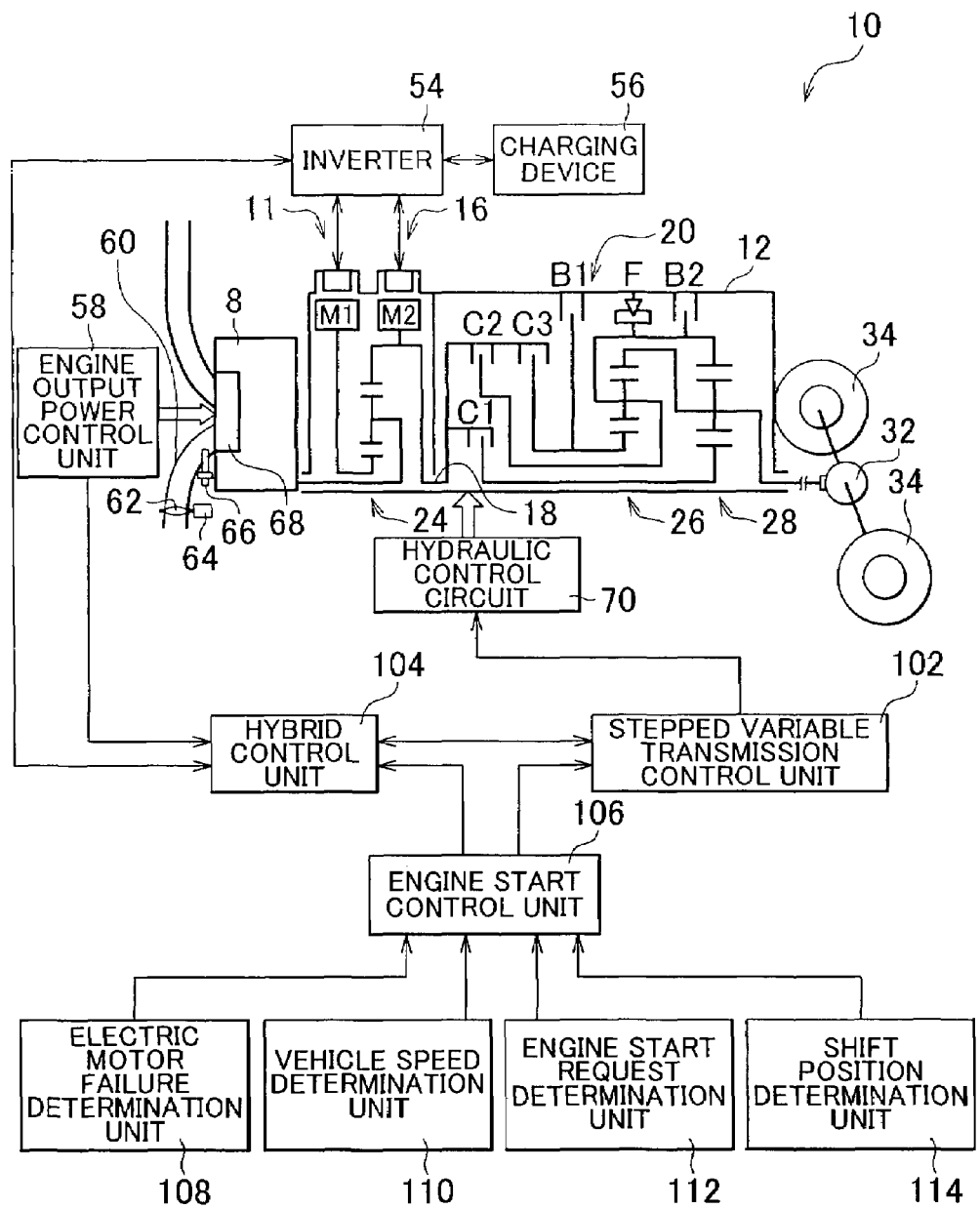
FIG. 6 is a function-based block diagram for explaining major control operation parts of the electronic control unit illustrated in FIG. 4.
Figure 7:
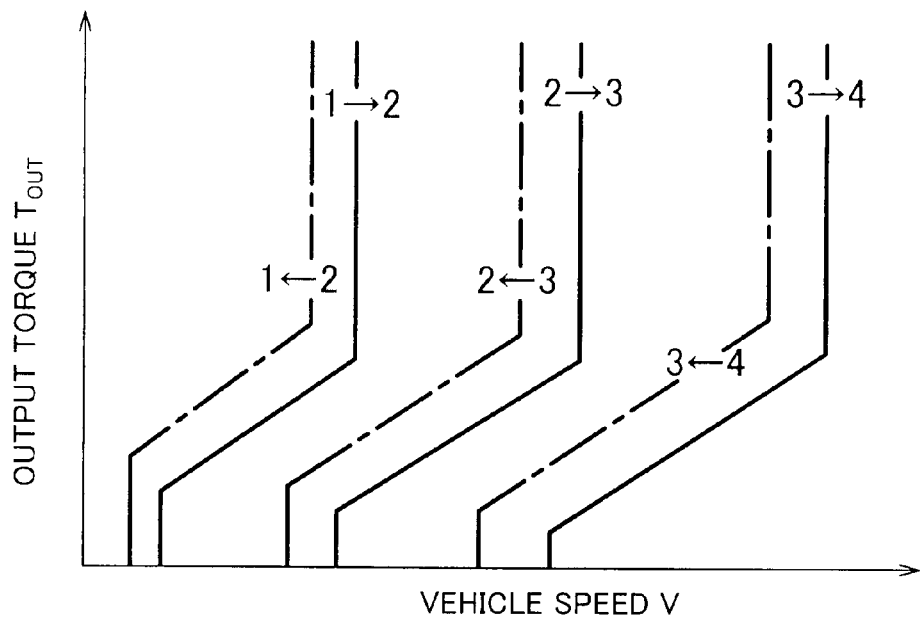
FIG. 7 is a view illustrating one example of shift diagrams used in shift control of the drive unit.

FIG. 6 is a function-based block diagram that explains a control function of the engine starting device, which is a part of the functions performed by the electronic control unit 100. Referring to FIG. 6, a stepped variable transmission control unit 102 determines whether a shift in the automatic transmission 20 should be performed, namely a target transmission range to be established in the automatic transmission 20, based on the relationship of a vehicle speed V and an output torque $T_{OUT}$ of the automatic transmission 20 pre-stored as variables, i.e., a shift diagram or a shift map having up-shift lines (solid lines) and down-shift lines (single-dotted lines) as shown in FIG. 7, and also based on the vehicle status represented by an actual vehicle speed V and a required output torque $T_{OUT}$ of the automatic transmission 20. Then, the stepped variable transmission control unit 102 executes automatic transmission control for the automatic transmission 20 to thereby obtain the determined target transmission range.

At this time, the stepped variable transmission control unit 102 issues commands (a shift output command and a hydraulic pressure command) to engage and/or release the hydraulically-operated friction coupling devices involved in shifting the automatic transmission 20 in accordance with the engagement operation table shown in FIG. 102. In other words, the stepped variable transmission control unit 102 actuates linear solenoid valves within the hydraulic control unit 70 to operate hydraulic actuators of the hydraulically-operated friction coupling devices involved in the shift such that the release-side coupling device is released while the engagement-side coupling device is engaged to thereby shift the automatic transmission 20.

A hybrid control unit 104 enables the engine 8 to operate in an efficient operation range and also controls the transmission ratio γ0 of the differential 11 as an electric continuously variable transmission by optimally changing a drive power distribution of the engine 8 and that of the second electric motor M2 and a reaction force induced by electricity generation of the first electric motor M1. For example, at a present vehicle speed V, the hybrid control unit 104 calculates the target output power of the motor vehicle based on the accelerator operating amount Acc and the vehicle speed V; calculates a required total target output power from the target output power and the required electricity charging amount of the motor vehicle; calculates a target engine output power to obtain the total target output power in consideration of a transfer loss, an assisted torque of the second electric motor M2 and the like; and controls the engine rotational speed $N_E$ and engine torque $T_E$ to achieve the target engine output power, while controlling the electricity generation quantity of the first electric motor M1.

Figure 8:
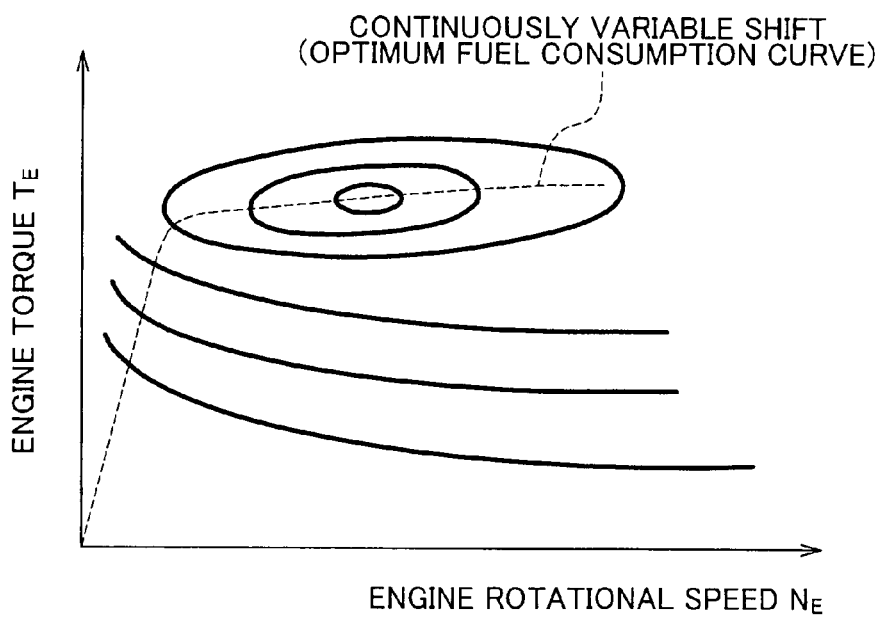
FIG. 8 shows one example of fuel consumption maps, with an optimum fuel consumption curve indicated by a broken line.

For example, the hybrid control unit 104 performs its control operation in view of the transmission range of the automatic transmission 20 to improve power performance and fuel economy. In such hybrid control, the differential 11 may function as an electric continuously variable transmission, which ensures that the engine rotational speed $N_E$ determined to assure an operation of the engine 8 in an efficient operation range is matched to the rotational speed of the transfer member 18 determined by the vehicle speed V and the transmission range of the automatic transmission 20. That is to say, the hybrid control unit 104 ensures that the engine 8 operates in accordance with an optimum fuel consumption curve, indicated by a broken line in two-dimensional coordinates of an engine rotational speed $N_E$ and an output torque of the engine 8 (an engine torque $T_E$) as illustrated in FIG. 8, that is empirically determined and stored in advance to assure compatibility of drivability and fuel economy when driving with the transmission operates in the continuously variable mode. To this end, for example, the hybrid control unit 104 determines a target value of the total transmission ratio γT of the transmission mechanism 10 for achieving an engine torque $T_E$ and an engine rotational speed $N_E$ required to satisfy a target output power, controls a transmission ratio γ0 of the differential 11 to obtain the target value based on the transmission range of the automatic transmission 20, and controls the total transmission ratio γT within a shiftable extent.

The hybrid control unit 104 then supplies the electric energy generated by the first electric motor M1 to the charging device 56 or the second electric motor M2 through an inverter 54. Therefore, a part of the output power of the engine 8 is consumed for electricity generation and converted to electric energy by the first electric motor M1, while the majority of the output power of the engine 8 is mechanically delivered to the transfer member 18. The electric energy is supplied to the second electric motor M2 via the inverter 54, whereby the second electric motor M2 is driven to deliver its mechanical energy to the transfer member 18. Thus, an electric path beginning with conversion of a part of the output power of the engine 8 to electric energy and ending with conversion of the electric energy to a mechanical energy is built up by the components involved in the process of generating the electric energy and consuming it in the second electric motor M2.

Regardless of whether a motor vehicle is at rest or in driving, the hybrid control unit 104 controls a rotational speed $N_{M1}$ of the first electric motor M1 and/or a rotational speed $N_{M2}$ of the second electric motor M2 by virtue of the electric continuously variable transmission function of the differential 11 so that the engine rotational speed $N_E$ may be kept nearly constant or controlled to a particular rotational speed. In other words, the hybrid control unit 104 controls the rotational speed $N_{M1}$ of the first electric motor M1 and/or the rotational speed $N_{M2}$ of the second electric motor M2 to a particular rotational speed, while keeping the engine rotational speed $N_E$ nearly constant or controlling it to a particular rotational speed.

For example, as can be seen from the collinear diagram illustrated in FIG. 3, when increasing the engine rotational speed $N_E$ during the driving of the motor vehicle, the hybrid control unit 104 increases the first electric motor rotational speed $N_{M1}$ while keeping the second electric motor rotational speed $N_{M2}$, which is restricted by the vehicle speed V, nearly constant. Furthermore, if the engine rotational speed $N_E$ remains substantially constant during a shifting operation of the automatic transmission 20, the hybrid control unit 104 changes the first electric motor rotational speed $N_{M1}$ against the change of the second electric motor rotational speed $N_{M2}$ attendant on the shifting operation of the automatic transmission 20 while keeping the engine rotational speed $N_E$ substantially constant.

Furthermore, the hybrid control unit 104 includes an engine output power controller that executes output power control of the engine 8 to produce a required engine output power by supplying the engine output power control unit 58 with different control commands independently or in combination. The control commands include a throttle control command for controlling the throttle actuator 64 to open and close the electronic throttle valve 62, a fuel injection control command for controlling a fuel injection quantity or timing of the fuel injection device 66 and an ignition timing control command for controlling ignition timing of the ignition device 68 such as an igniter.

For example, the hybrid control unit 104 normally drives the throttle actuator 64, by using a pre-stored relationship not shown in the drawings, based on the accelerator operating amount Acc, and performs throttle control in such a way that the throttle opening degree $\theta_{TH}$ is increased as the accelerator operating amount Acc increases. Responsive to the commands issued by the hybrid control unit 104, the engine output power control unit 58 executes an engine torque control by controlling the throttle actuator 64 to open and close the electronic throttle valve 62, controlling a fuel injection quantity or timing of the fuel injection device 66, and controlling ignition timing of the ignition device 68 such as an igniter.

Regardless of whether the engine 8 is in a non-operated state or in an idling state, the hybrid control unit 104 is capable of driving a motor vehicle with electric motor power by use of the electric continuously variable transmission function (differential action) of the differential 11. For example, the hybrid control unit 104 may drive the electric motor either in a range of relatively low output torque $T_{OUT}$, i.e., in a range of low engine torque $T_E$, in which engine efficiency is usually inferior to that in a high torque region, or in a region of relatively low vehicle speed V, i.e., in a reduced load region. During the process of electric motor driving, the hybrid control unit 104 controls the first electric motor rotational speed $N_{M1}$ to be a negative rotational speed, e.g., allows the first electric motor M1 to be idled, by using the electric continuously variable transmission function (the differential action) of the differential 11 and, if necessary, keeps the engine rotational speed $N_E$ at zero or nearly zero by using the differential action of the differential 11, so that the engine 8 at rest is inhibited from being driven to thereby improve fuel economy.

Even in an engine driving region, the hybrid control unit 104 supplies the second electric motor M2 with electric energy from the first electric motor M1 and/or the charging device 56 through the electric path noted above and drives the second electric motor M2 to apply a torque to the driven wheels. This makes it possible to perform so-called torque assistance that assists in increasing the output power of the engine 8.

Furthermore, the hybrid control unit 104 puts the first electric motor M1 in a loadless state by interrupting a drive current supplied from the charging device 56 to the first electric motor M1 via the inverter 54. In the loadless state, the first electric motor M1 is allowed to make free rotation, i.e., idle rotation, and the differential 11 comes into a state in which a torque cannot be transferred, i.e., a state equivalent to the state in which the power transmission path in the differential 11 is cut off. In this state, no output power is generated from the differential 11. That is to say, by making the first electric motor M1 loadless, the hybrid control unit 104 brings the differential 11 into a neutral state in which the power transmission path thereof is disconnected.

An engine start control unit 106 is designed to start the engine 8 at rest, e.g., when the charging capacity of the charging device 56 is equal to or smaller than a predetermined charging capacity, which is set to prevent any degradation of the charging device 56, when an engine coolant temperature $TEMP_W$ or a catalyst temperature is lower than a predetermined temperature, when an increased output power is required to, e.g., accelerate a motor vehicle, when an air conditioner A/C is in an operating state, or other similar circumstances.

When the motor vehicle is stopped, with the shift lever 52 placed in the "D" range, e.g., when the motor vehicle is waiting for a traffic light to change the engine 8 is usually at rest. In this state, the motor vehicle is started by use of the drive power of the second electric motor M2. However, if there is a need to operate the engine 8 even in this state, the engine start control unit 106 issues an engine start command.

Figure 9:
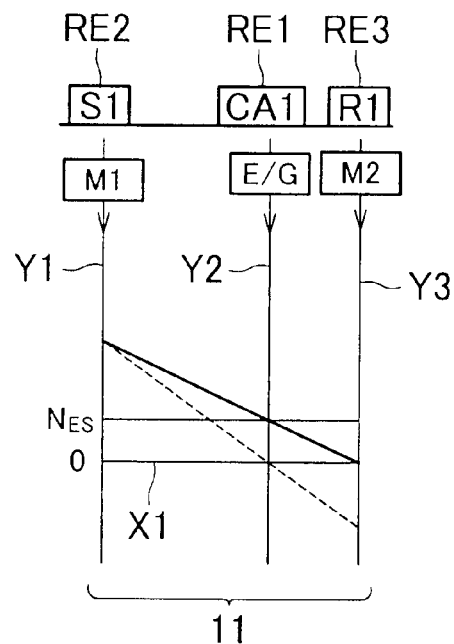
FIG. 9 is a collinear diagram illustrating rotational speeds of individual rotating elements of a differential at the time of starting up an engine.

FIG. 9 is a collinear diagram that illustrates the respective rotational speeds of the individual rotating elements of the differential 11 when starting the engine 8. When starting the engine 8, the rotational speed $N_E$ of the engine 8 is increased to an engine starting speed $N_{ES}$ (hereinafter "starting speed") or more, by allowing the first electric motor M1 to rotate the first rotating element RE1, corresponding to the first sun gear S1, and by fixing the rotational speed of the third rotating element RE3, corresponding to the first ring gear R1, to, e.g., about zero, to thereby generate a reaction force as indicated by a solid line in FIG. 9. As set forth above, it is possible to fix the rotational speed of the third rotating element RE3 to about zero or a specified value and to generate a reaction force, e.g., by suitably controlling the second electric motor M2.

In the event that the second electric motor M2 is malfunctioning, it may be necessary to start the engine 8 to move the motor vehicle. However, because no reaction force can be generated in the third rotating element RE3 when the second electric motor M2 fails, the third rotating element RE3 is rotated in a reverse direction as indicated by a broken line in FIG. 9, thereby making it impossible to increase the rotational speed of the engine 8. In this regard, to generate a reaction force in the third rotating element RE3, it may be necessary to establish, e.g., the first gear range in the automatic transmission 20 to achieve a power-transfer state, namely to connect the third rotating element RE3 to the output shaft 22, i.e., the driven wheels 34, through the automatic transmission 20. However, unlike the case that the shift lever 52 is placed in the "P" range, the output shaft 22 is not mechanically fixed while the shift lever 52 is in the "D" range. Thus, the motor vehicle may possibly move backward by the reverse rotation of the third rotating element RE3 indicated by the broken line in FIG. 9. In the present embodiment, there is provided an electric fluid pump (not shown), wherein the pump generates a fluid pressure to engage the clutches C and the brakes B even when the engine 8 is at rest.

In view of the above circumstances, the engine start control unit 106 can safely start the engine 8 when the second electric motor M2 fails. The engine start control unit 106 engages the clutches C and the brakes B to drive the first electric motor M1, based on signals from an electric motor failure determination unit 108 determines whether the second electric motor M2 is malfunctioning, a vehicle speed determination unit 110 determines whether a vehicle speed V is nearly zero, i.e., no greater than a predetermined value, an engine start request determination unit 112 determines whether the engine start is requested and a shift position determination unit 114 determines whether the position of the gear lever 52 is in "D", namely in the driving position.

The electric motor failure determination unit 108 determines whether the second electric motor M2 has failed by, e.g., comparing the second electric motor rotational speed $N_{M2}$ detected by an second electric motor rotational speed sensor with a required rotational speed instructed by the electronic control unit 100.

The vehicle speed determination unit 110 calculates the vehicle speed V based on the rotational speed of the output shaft 22 detected by a rotational speed sensor provided at the output shaft 22 and then judges whether the vehicle speed V is nearly zero. The engine start request determination unit 112 determines presence or absence of an engine start request based on, e.g., a signal that indicates accelerator operating amount Acc, namely an accelerator pedal depression amount, or a charging capacity of the charging device 56. The shift position determination unit 114 determines whether the shift lever 52 is in "D", based on a signal indicative of the gear positions $P_{SH}$.

Figure 10:
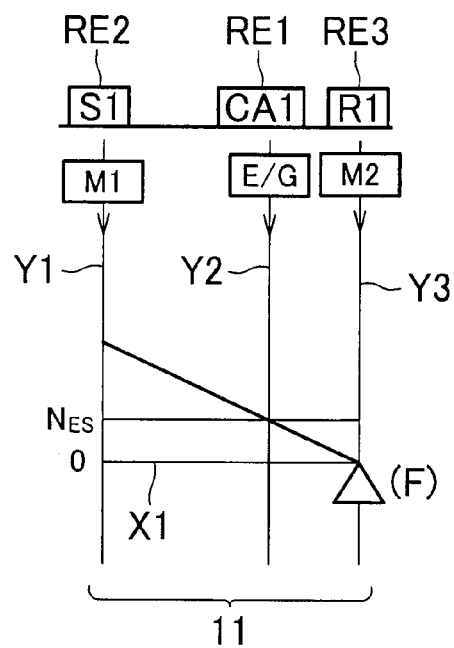
FIG. 10 is a collinear diagram illustrating respective rotational speeds of individual rotating elements of the differential at the time of starting up the engine when a second electric motor fails.

If each of the respective determination units determines that the second electric motor M2 is malfunctioning, and the vehicle speed V being nearly zero, i.e., no greater than a specified value, the starting of the engine 8 being requested, and the shift lever 52 is in "D", namely when a determination is rendered that there exists a need to start the engine 8, then the engine 8 is started by the engine start control unit 106. When starting the engine 8 when the second electric motor M2 fails, the third or fourth gear range for instance is established in the automatic transmission 20, thereby bringing the latter into a power transfer state. As illustrated in FIG. 2, the third and fourth gear ranges are respectively established by engaging the second clutch C2. If the second clutch C2 is engaged, the sixth rotating element RE6 formed by interconnecting the second carrier CA2 and the third ring gear R3 is directly connected to the third rotating element RE3 (the first ring gear R1) of the differential 11 through the transfer member 18, as shown in FIGS. 1 and 3. In this regard, because the sixth rotating element RE6 is connected to the case 12 by way of the one-way clutch F as shown in FIG. 1, it is prevented from rotating in a direction opposite to the rotational direction of the engine 8 (hereinbelow, this rotation will be referred to as an "opposite rotation"). Thus, the opposite rotation of the third rotating element RE3, i.e., the first ring gear R1, connected to the sixth rotating element RE6 is prevented by the one-way clutch F as shown in the collinear diagram of the differential 11 illustrated in FIG. 10. This makes it possible to fix the rotational speed of the third rotating element RE3 to nearly zero or exactly zero and to generate a reaction force as shown in FIG. 10, whereby the rotational speed of the engine 8 may be safely increased up to the starting speed $N_{ES}$ by driving the first electric motor M1. As set forth above, the engine start control unit 106 drives the first electric motor M1 to start the engine 8 while engaging the second clutch C2 to directly connect the transfer member 18 to the sixth rotating element RE6. Furthermore, because the engine start is carried out at a vehicle speed V of about zero in the present embodiment, the rotational speed of the sixth rotating element RE6 is nearly zero and the rotational speed of the third rotating element RE3 is also about zero as can be seen from the collinear diagram illustrated in FIG. 10. The sixth rotating element RE6 of the present embodiment corresponds to the irreversible rotation member in the present invention.

Even if the second gear range is established in the automatic transmission 20, it is possible to safely start the engine 8 when the second electric motor M2 fails. As shown in FIG. 2, the second gear range may be established by engaging the first clutch C1 and the first brake B1. Thus, because the second sun gear S2 is held against rotation by the engagement of the first brake B1, and the second carrier CA2 is prevented from oppositely rotating by the one-way clutch F in the second planetary gear set 26 shown in FIG. 1, the second ring gear R2 is rotated at a speed greater than that of the second carrier CA2 in a forward direction (the same rotational direction as the engine 8) and is prevented from oppositely rotating under the differential action of the second planetary gear set 26. Furthermore, because the third ring gear R3 is prevented from oppositely rotating by the one-way clutch F and the third carrier CA3 is connected to the second ring gear R2 in the third planetary gear set 28, the third carrier CA3 is also prevented from oppositely rotating like the second ring gear R2. Moreover, the third ring gear R3 and the third carrier CA3 are all kept from rotating in the opposite direction and the rotational speed of the third carrier CA3 connected to the second ring gear R2 becomes greater than that of the third ring gear R3. Therefore, the third sun gear S3 corresponding to the fourth rotating element RE4 is prevented from rotating in the opposite direction under the differential action of the third planetary gear set 28. The fourth rotating element RE4 of the present embodiment embodies the other irreversible rotation member in the present invention.

Referring to the collinear diagram shown in FIG. 3, the second gear range is represented by the inclined straight line L2 drawn at the time of simultaneous engagement of the first clutch C1 and the first brake B1. Individual intersecting points of the straight line L2 with the vertical lines indicate the relative rotational speeds of the respective rotating elements. In this regard, because the rotational speed of the seventh rotating element RE7 is fixed to zero by the engagement of the first brake B1 and the sixth rotating element RE6 is prevented from rotating in the opposite direction by the one-way clutch F, the straight line L2 is always placed in a region above the horizontal line X1 indicating a rotational speed of zero, in case of the fourth rotating element RE4 and the fifth rotating element RE5. This ensures that the fourth rotating element RE4 and the fifth rotating element RE5 are all prevented from rotating in opposite directions. Upon engagement of the first clutch C1 in the second gear range, the third rotating element RE3 is connected to the fourth rotating element RE4 corresponding to the third sun gear S3 through the transfer member 18. The fourth rotating element RE4 is kept from rotating in the opposite direction, as mentioned above, and can therefore function as a reaction force generating member. This makes it possible to safely increase the rotational speed of the engine 8 up to the starting speed $N_{ES}$ by driving the first electric motor M1. In this way, the engine start control unit 106 makes the fourth rotating element RE4 irreversible by engaging the first brake B1 and drives the first electric motor M1 to thereby start the engine 8 by connecting the transfer member 18 to the fourth rotating element RE4, i.e., by indirectly connecting the transfer member 18 to the irreversible sixth rotating element RE6. Furthermore, because the engine is started at a vehicle speed V of about zero in the present embodiment, the rotational speed of the fourth rotating element RE4 is nearly zero and the rotational speed of the third rotating element RE3 is also about zero as can be seen from the collinear diagram illustrated in FIG. 10.

Figure 11:
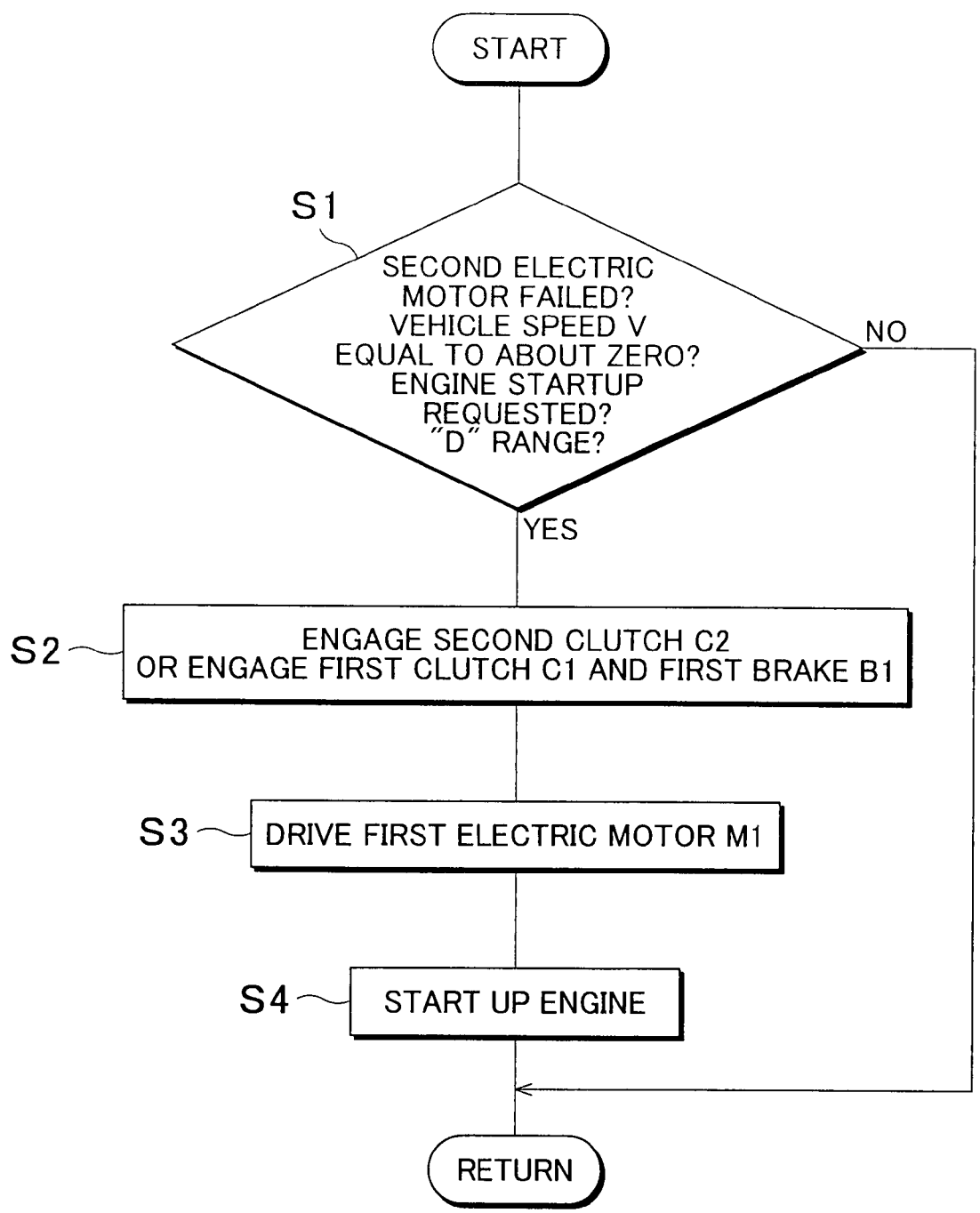
FIG. 11 is a flowchart for explaining major control operations of the electronic control unit, i.e., engine start control operations in case of occurrence of a failure in the second electric motor.

FIG. 11 is a flowchart explaining the major control operations of the electronic control unit 100, namely control operations of the engine starting device, when the second electric motor M2 fails. The control operations are repeatedly executed in an extremely short cycle time of, e.g., about several milliseconds to several tens milliseconds. Referring to FIG. 11, it is first determined whether the engine 8 needs to be started, in step S1, which carries out the function of the electric motor failure determination unit 108, the vehicle speed determination unit 110, the engine start request determination unit 112 and the shift position determination unit 114.

More specifically, the electric motor failure determination unit 108 determines whether the second electric motor M2 is malfunctioning. If the second electric motor M2 is judged to be malfunctioning, the vehicle speed determination unit 110 determines whether the vehicle speed V is nearly zero. If the vehicle speed V is judged to be nearly zero, the engine start request determination unit 112 determines whether there is a request for starting the engine 8. If the request for starting the engine 8 is determined to exist, the shift position determination unit 114 determines whether the shift lever 52 is placed in the "D" range, namely in the driving position. This routine is terminated if at least one of the determinations made by the four determination units is negative.

On the other hand, if the determinations noted above are all affirmative, the process proceeds to step S2 where the third or fourth gear range is established by engaging the second clutch C2, or the second gear range is established by engaging the first clutch C1 and the first brake B1. By doing so, the rotational speed of the first ring gear R1, included in the third rotating element RE3, is fixed to about zero through the transfer member 18, thus generating a reaction force in the first ring gear R1. In step S3, the first electric motor M1 increases the rotational speed of the engine 8 up to the starting speed $N_{ES}$. Finally, in step S4, commands for controlling the opening or closing operation of the electronic throttle valve 62, the fuel injection operation and the ignition timing are output to the engine output power control unit 58 to thereby start the engine 8. Steps S1 to S4 noted above implement the engine start control unit of the present invention.

As described above, the engine starting device of the present embodiment ensures that, even if the second electric motor M2 for generating a reaction force when starting the engine 8 with the first electric motor M1 is malfunctioning, a reaction force may be generated by suitably engaging the clutches C and the brakes B to generate the reaction force in the third rotating element RE3 and by directly or indirectly connecting the third rotating element RE3 to the irreversible sixth rotating element RE6 to thereby fix the third rotating element RE3 in place. Thus, even though the gear position of a motor vehicle is in "D", it is possible to start the engine 8 with no risk of having the motor vehicle to run backward.

Furthermore, in accordance with the engine starting device of the foregoing embodiment, the transfer member 18 may be directly connected to the sixth rotating element RE6 by engaging the second clutch C2. Thus, a reaction force may be generated in the third rotating element RE3 to start the engine 8 without having to restrict rotation of other rotating elements.

Moreover, in accordance with the engine starting device of the foregoing embodiment, a reaction force may be generated in the third rotating element RE3 to start the engine 8, by providing the fourth rotating element RE4 that becomes irreversible when the first brake B1 is engaged and by connecting the transfer member 18 to the fourth rotating element RE4.

In addition, in accordance with the engine starting of the foregoing embodiment, the engine starting control unit 106 starts the engine 8 based on the determinations of the electric motor failure determination unit 108, the vehicle speed determination unit 110, the engine start request determination unit 112 and the gear position determination unit 114. This makes it possible to safely start the engine 8 even when the second electric motor M2 is malfunctioning.

Although the example embodiment of the present invention has been described in detail above, it should be appreciated that the present invention is applicable to other embodiments.

For example, although the automatic transmission 20 employed in the foregoing embodiment is a transmission having four forward gear ranges and one reverse gear range, the present invention is no limited thereto. For instance, the present invention may be applied to an automatic transmission that has three forward gear ranges and one reverse gear range, as long as the transmission is provided with a one-way clutch. That is to say, when using a transmission with a one-way clutch, the present invention would be realized by directly or indirectly connecting the transfer member 18 to a rotation member whose opposite rotation is prevented by the one-way clutch.

In the power distribution mechanism 16 of the foregoing embodiment, the first carrier CA1 is connected to the engine 8, the first sun gear S1 being connected to the first electric motor M1 and the first ring gear R1 being connected to the transfer member 18. However, the present invention is not limited to such connection but the engine 8, the first electric motor M1 and the transfer member 18 may be connected to any one of the three rotating elements CA1, S1 and R1 of the first planetary gear set 24.

Although the engine 8 is directly connected to the input shaft 14 in the foregoing embodiment, it may be operatively connected to the input shaft 14 through, e.g., gears, belts or the like. Also, there is no need to arrange the engine 8 and the input shaft 14 on a common axis.

In the foregoing embodiment, the first electric motor M1 and the second electric motor M2 are concentrically arranged with respect to the input shaft 14, where the first electric motor M1 is connected to the first sun gear S1 and the second electric motor M2 is connected to the transfer member 18. However, it is not mandatory to employ such arrangement. Alternatively, the first electric motor M1 may be operatively connected to the first sun gear S1 and the second electric motor M2 may be operatively connected to the transfer member 18 by way of, e.g., gears, belts, reduction gears or the like.

In the foregoing embodiment, the hydraulically-operated frictional coupling devices including the first clutch C1 and the second clutch C2 may be coupling devices of magnetic powder type, electromagnetic type or mechanical type, such as a powder (magnetic powder) clutch, an electromagnetic clutch and a meshing type dog clutch. For example, in case of the electromagnetic clutch, the hydraulic control circuit 70 may include switching devices or electromagnetic converting devices for switching a circuit that supplies electric command signals to the electromagnetic clutch instead of valve devices for changing over flow paths.

Although the automatic transmission 20 is serially connected to the differential 11 via the transfer member 18 in the foregoing embodiment, it may be possible to provide a counter shaft extending parallel to the input shaft 14 and to concentrically arrange the automatic transmission 20 on the counter shaft. In this case, the differential 11 and the automatic transmission 20 are connected to each other in a power-transferable manner through, e.g. a set of transfer members including a pair of counter gears, sprockets and a chain, which serve as the transfer member 18 noted above.

The power distribution mechanism 16 of the foregoing embodiment serving as a differential mechanism may be, e.g., a differential gear set that includes a pinion rotatably driven by the engine 8 and a pair of bevel gears that mesh with the pinion, wherein the bevel gears are operatively associated with the first electric motor M1 and the second electric motor M2.

Although the power distribution mechanism 16 of the foregoing embodiment includes a single planetary gear set, the power distribution mechanism 16 may include two or more planetary gear sets so that it can function as a transmission with three or more gear ranges in a non-differential state (constant transmission state). Moreover, the planetary gear set of the power distribution mechanism 16 is not limited to a single pinion type but may be a double pinion type.

Although the engine 8 is started in the gear position "D" in the foregoing embodiment, the present invention may be applied to a case where the engine 8 is started in "R". This is because the operation of starting the engine 8 has nothing to do with the forward or reverse movement of the motor vehicle.

While the invention has been shown and described with respect to example embodiments, it will be understood by those skilled in the art that various changes and modifications may be made without departing from the scope of the invention as defined in the following claims.

The invention claimed is:

1. An engine starting device for a hybrid motor vehicle, comprising:
   a differential that includes a differential mechanism having a first rotating element, which is connected to an engine, a second rotating element, which is connected to a first electric motor, and a third rotating element, which is an output shaft connected to a second electric motor and a transfer member in a manner such that a power can be constantly transmitted, wherein the differential mechanism distributes an output power of the engine to the first electric motor and the transfer member, and the differential functions as an electronic differential device;
   a transmission, serially provided between the output shaft of the differential and driven wheels, that establishes a plurality of transmission ranges by selectively operating a plurality of coupling devices;
   an irreversible rotation member is provided, and the irreversible rotation member is connected to a non-rotating member against reverse rotation through a one-way clutch provided in the transmission; and
   an engine start control unit that starts the engine by driving the first electric motor while engaging the coupling devices to directly or indirectly connect the output shaft of the differential to the irreversible rotation member to prevent the output shaft of the differential from rotating in reverse when the second electric motor malfunctions.

2. The engine starting device according to claim 1, wherein the engine start control unit directly connects the output shaft of the differential to the irreversible rotation member by engaging the coupling devices.

3. The engine starting device according to claim 1, wherein the coupling devices comprise a brake for holding a specified rotation member against rotation, and
   the engine start control unit prevents another rotation member from rotating in reverse by engaging the brake, and prevents the output shaft of the differential from rotating in reverse by connecting the output shaft of the differential to the other rotation member.

4. The engine starting device according to claim 1, wherein the engine start control unit engages the coupling devices to drive the first electric motor when it is determined that the second electric motor is malfunctioning, a vehicle speed is equal to or smaller than a predetermined speed, an engine start is requested, and a shift lever is in a driving range.

* * * * *